(12) United States Patent
Schmidt et al.

(10) Patent No.: US 8,583,202 B2
(45) Date of Patent: Nov. 12, 2013

(54) METHOD OF MANAGING THERMAL CONTRACTION OF A SUPERCONDUCTOR CABLE AND ARRANGEMENT FOR IMPLEMENTING THIS METHOD

(75) Inventors: Frank Schmidt, Langenhagen (DE); Nicolas Lallouet, Fiennes (FR); Sébastien Delplace, Loon-Plage (FR); Erik Marzahn, Langenhagen (DE)

(73) Assignee: Nexans, Paris (FR)

( * ) Notice: Subject to any disclaimer, the term of this patent is extended or adjusted under 35 U.S.C. 154(b) by 95 days.

(21) Appl. No.: 13/204,897

(22) Filed: Aug. 8, 2011

(65) Prior Publication Data

US 2012/0053061 A1    Mar. 1, 2012

(30) Foreign Application Priority Data

Aug. 31, 2010  (FR) ...................... 10 56878

(51) Int. Cl.
 *H01L 39/24*    (2006.01)

(52) U.S. Cl.
 USPC ........................................ 505/230

(58) Field of Classification Search
 USPC ................................. 505/230, 813
 See application file for complete search history.

(56) References Cited

U.S. PATENT DOCUMENTS

| 7,030,314 | B2 | 4/2006 | Ashibe et al. |
| 2010/0126748 | A1 * | 5/2010 | Traeholt et al. ............. 174/15.5 |

FOREIGN PATENT DOCUMENTS

| EP | 0144146 | * | 6/1985 |
| WO | WO 2008/113366 | * | 9/2008 |

* cited by examiner

*Primary Examiner* — Colleen Dunn
(74) *Attorney, Agent, or Firm* — Sofer & Haroun, LLP

(57) ABSTRACT

A method of managing thermal contraction of a superconductor cable (2) having a cable body surrounded by an external screen (2A) made form wound metal elements and installed between its ends in an enclosure (1) or cryostat filled with a cryogenic liquid, where the method includes mechanically applying a locking force loading only said screen (2A) at a so-called locking point (5A, 5B) in the vicinity of the ends of the cable.

6 Claims, 5 Drawing Sheets

METHOD OF MANAGING THERMAL CONTRACTION OF A SUPERCONDUCTOR CABLE AND ARRANGEMENT FOR IMPLEMENTING THIS METHOD

RELATED APPLICATION

This application claims the benefit of priority from French Patent Application No. 10 56878, filed on Aug. 31, 2010, the entirety of which is incorporated by reference.

BACKGROUND

1. Field of the Invention

The invention concerns a method of managing thermal contraction of a superconductor cable and an arrangement for implementing this method.

2. Description of Related Art

A superconductor cable generally comprises a metal, for example copper, support onto which is wound a superconductor material tape itself covered with an insulator such as paper, and an external metal screen consisting of tapes or wires, for example made of copper. The combination of the support, the tape and the insulator is referred to hereinafter as the cable body.

A superconductor cable is immersed at a high temperature in a cryogenic fluid in order to function correctly. This cooling to a temperature of the order of −200° C. leads to significant thermal contraction of the cable, which must be managed.

It is known, for example from the patent document EP 1 489 692, to manage this contraction by means of a flexible conductor connected to the end of the cable or by means of sliding contacts.

OBJECTS AND SUMMARY

This type of solution nevertheless proves not to be usable industrially. The contraction is of the order of 0.3% of the length of the cable and over lines with a length of several kilometers reaches several meters, impossible or difficult to manage economically by means of sliding contacts or flexible conductors. It would moreover be necessary to erect corresponding and bulky additional civil engineering structures, which might even be impossible given the space available.

The invention solves this problem and proposes a method of managing thermal contraction of a superconductor cable comprising a cable body surrounded by an external screen consisting of wound metal elements and installed between its ends in an enclosure filled with a cryogenic liquid, characterized in that it consists in mechanically applying a locking force loading only said screen at a so-called locking point in the vicinity of said ends of the cable.

The conductor elements forming the screen, wound with a certain pitch, are mechanically strong wires or tapes that may therefore be tightened without difficulty. These are either resistive, for example copper, elements or metal mechanical reinforcement elements.

On cooling such a cable, the resulting constant contraction force, of the order of several tons, tends to tighten these wound elements of the screen and to reduce their winding pitch between the two ends of the cable. According to the invention, the screen being locked at the two locking points, this pitch remains constant but there results a radial pressure on all the other elements or layers of the superconductor cable constituting the cable body, which locks them. Thus only the screen needs to be locked, in order to prevent longitudinal displacement caused by thermal contraction of the cable.

In a preferred embodiment, the method consists in mechanically locking said screen between each of said ends of the cable and said enclosure.

The method advantageously consists in mechanically locking said screen in a supplementary cryostat module disposed between each of said ends of the cable and said enclosure.

Said locking force is preferably transmitted to a support device fixed to the ground or the like.

The contraction between said locking point and the nearby end of the cable may be managed by a sliding contact.

The invention also relates to a locking arrangement for implementing this kind of method, characterized in that it comprises a ring disposed under said screen at said locking point and two annular flanges of complementary internal shape disposed on either side of the plane of symmetry of said ring and clamped to each other.

Such a locking arrangement may withstand a relatively high force, of the order of several tons.

In a preferred embodiment, said ring has a convex external surface of circular arc shape and said annular flanges have a complementary rounded internal shape.

At least one of said flanges is preferably fastened to a support device fixed to the ground or the like.

Finally, the invention relates to a method of installing an arrangement of this kind, characterized in that it consists in sliding said ring under said screen from the end of the cable as far as the locking point and then installing said flanges.

At the end of the cable said ring is preferably equipped with two removable external handles disposed between two adjacent conductor elements of the screen and is turned and slid as far as she locking point.

Such a method does not affect the continuity of the screen of the cable and therefore necessitates no specific connection of the screen.

It is moreover particularly simple and of relatively low cost.

BRIEF DESCRIPTION OF THE DRAWINGS

The invention is described in more detail hereinafter with reference to the figures, which merely show one preferred embodiment of the invention.

DETAILED DESCRIPTION

Figure 1:
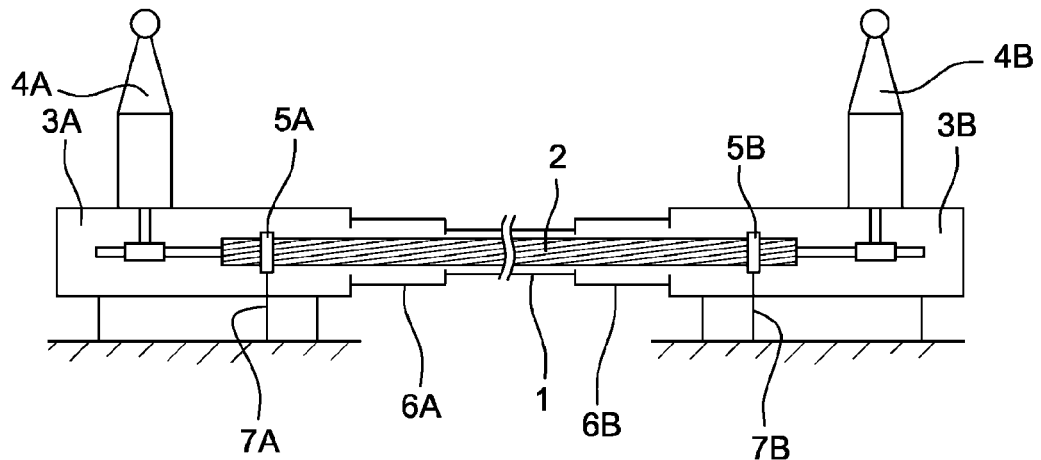
FIGS. 1 and 2 are views in vertical section of a line comprising a superconductor cable of the invention.
Figure 2:
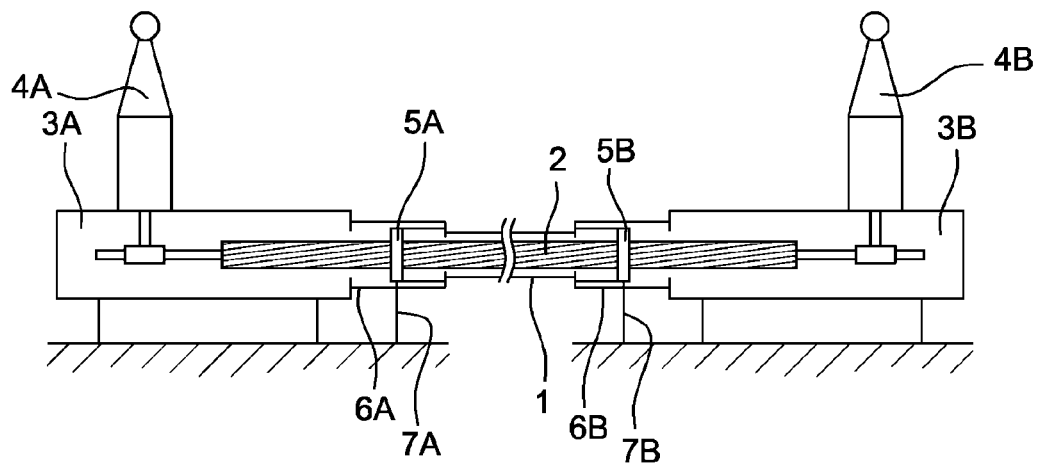

As shown in FIGS. 1 and 2, a line comprising a superconductor cable includes an enclosure 1 called a cryostat filled with a cryogenic fluid and containing the cable 2, the ends of which are disposed in a termination 3A, 3B in which the resistive metal support of the cable is connected to outputs 4A, 4B.

The cable 2 includes an external screen consisting of wound metal elements in the form of wires or tapes to which screen is mechanically applied a locking force loading only the screen, at a so-called locking point 5A, 5B in the vicinity of the ends of the cable. This locking force does not load the cable body at the locking point.

The line may equally comprise an additional cryostat module 6A, 6B disposed between the cryostat 1 and the terminations 3A, 3B.

Generally speaking, the method of the invention consists in mechanically locking the screen between each of the ends of the cable 1 and the cryostat 1.

These locking points may be disposed in the terminations 3A, 3B as shown in FIG. 1 or preferably in the additional cryostat modules 6A, 6B as shown in FIG. 2.

The locking force is transmitted to a mechanically strong support device 7A, 7B fixed to the ground or the like. The locking arrangement is generally fastened to the enclosure of the cryostat 1 or of the additional cryostat module 6A, 6B and this enclosure is for its part firmly fastened to the ground.

The contraction between the locking point 5A, 5B and the nearby end of the cable may for its part be managed by a sliding contact.

Figure 3:
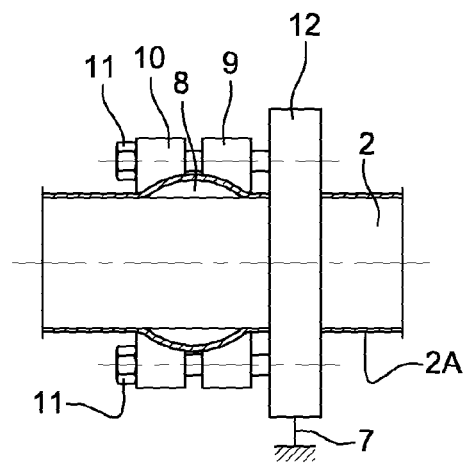
FIGS. 3 to 5 are views in vertical section of a locking arrangement of the invention.
Figure 4:
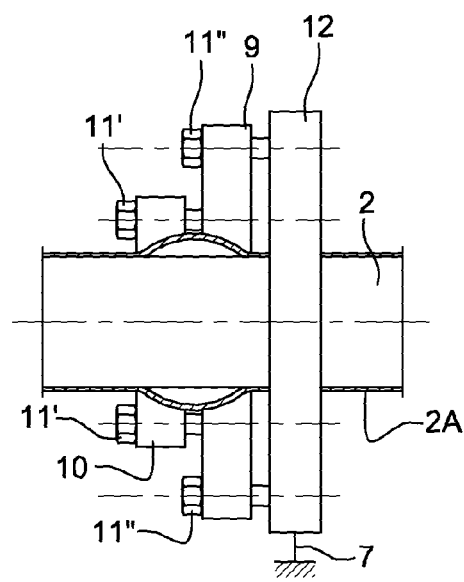
Figure 5:
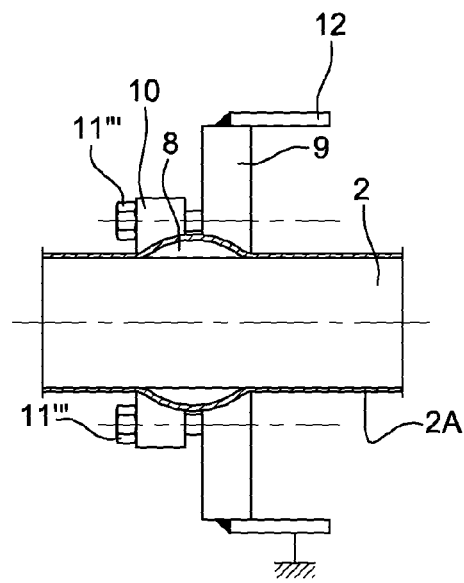

FIGS. 3 to 5 show in vertical section embodiments of a locking arrangement for implementing the above method.

This locking arrangement includes a ring 8 having a smooth external surface and disposed under the screen 2A at said locking point and two annular flanges 9, 10 having an inside diameter slightly greater than the outside diameter of the cable 1 and of complementary internal shape disposed on either side of the plane of symmetry of the ring and clamped together by means of a screwing system. This ring has an inside diameter slightly greater than the outside diameter of the cable outside the screen 2A.

The ring 8 preferably has a convex external surface of circular arc shape and the annular flanges 9, 10 preferably have a complementary rounded internal shape.

This ring 8 is made from a mechanically strong material and has no specific electrical property. It is preferably made of stainless steel.

The flanges 9, 10 are fastened to a support device 12 fastened to the ground 7.

There may a single screwing system 11 that may fix the two flanges 9, 10 together and also fix them to the support device 12, as shown in FIG. 3.

Two screwing systems may equally be provided, one system 11' fixing the two flanges 9, 10 together and the other system 11" fixing one of the flanges 9 to the support device 12, as shown in FIG. 4.

There may be only one screwing system 11''' that fixes the two flanges 9, 10 together, one of the flanges 9 being welded to the support device 12, as shown in FIG. 5.

FIGS. 6 to 13 illustrate in perspective the method of installing the above arrangement.

Figure 6:
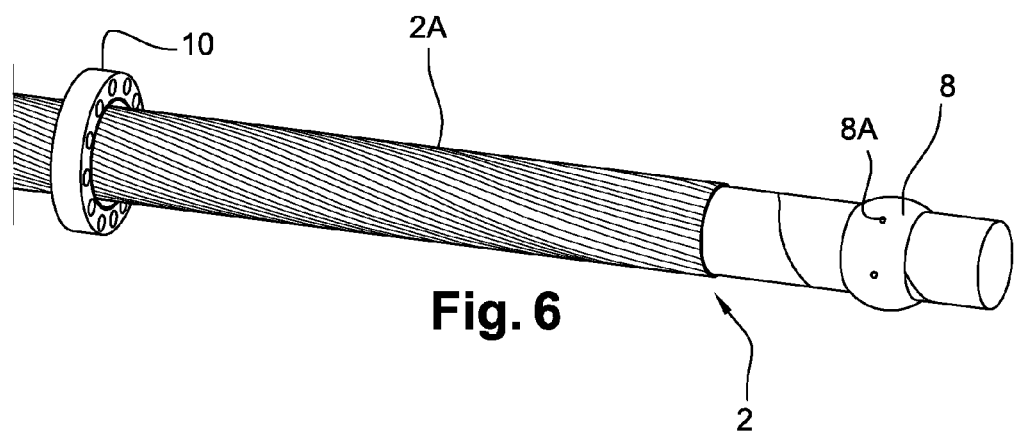
FIGS. 6 to 13 illustrate in perspective the method of the invention of installing this arrangement.

As shown in FIG. 6, one of the flanges 10 is threaded over the end concerned of the cable 2 and part of the screen 2A is removed at this end, onto which the ring 8 is threaded. It includes a set of orifices 8A the function of which is explained below.

Figure 7:
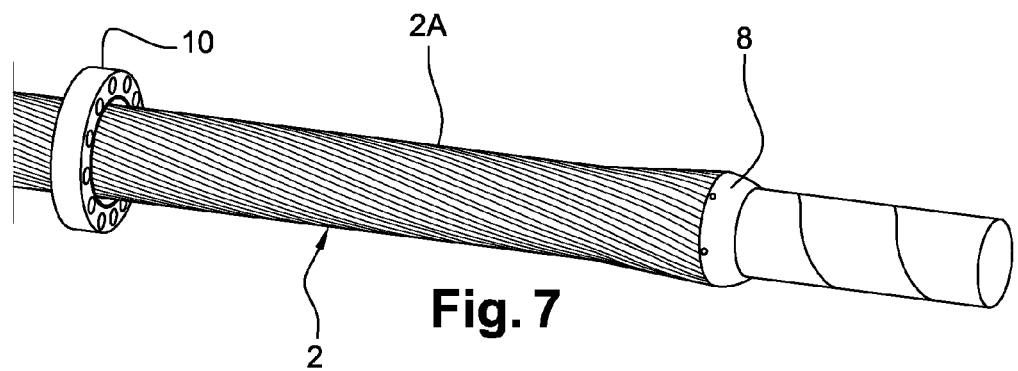

As shown in FIG. 7, the ring 8 is slid partially under the screen 2A.

Figure 8:
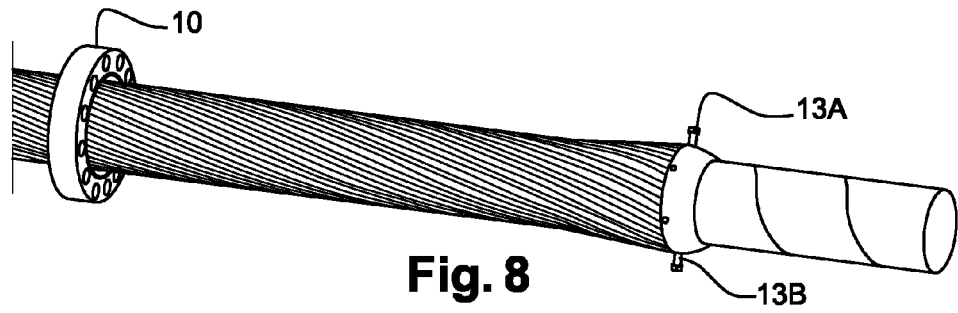

As shown in FIG. 8, two removable external handles 13A, 13B are introduced into two diametrically opposite orifices 8A. These handles take the form of simple tie-rods.

Figure 9:
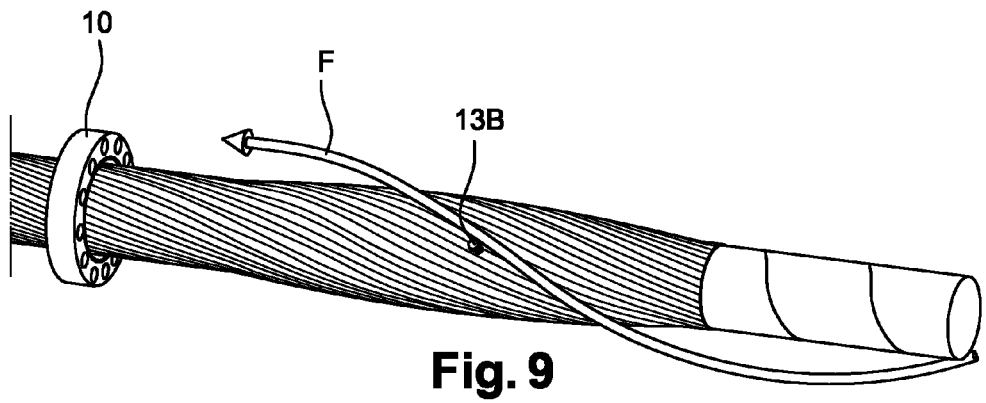
Figure 10:
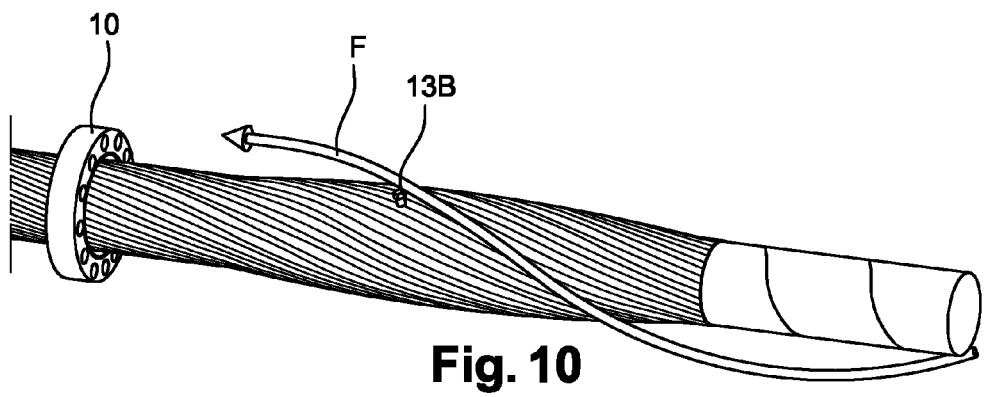

As shown in FIGS. 9 and 10, the two removable external handles 13A, 13B are disposed between two adjacent conductor elements of the screen 2A and the ring 8 is slid under the screen from the end of the cable as far as the locking point by rotating it and sliding it in the direction of the arrow F according to the pitch of the two conductor elements.

Figure 11:
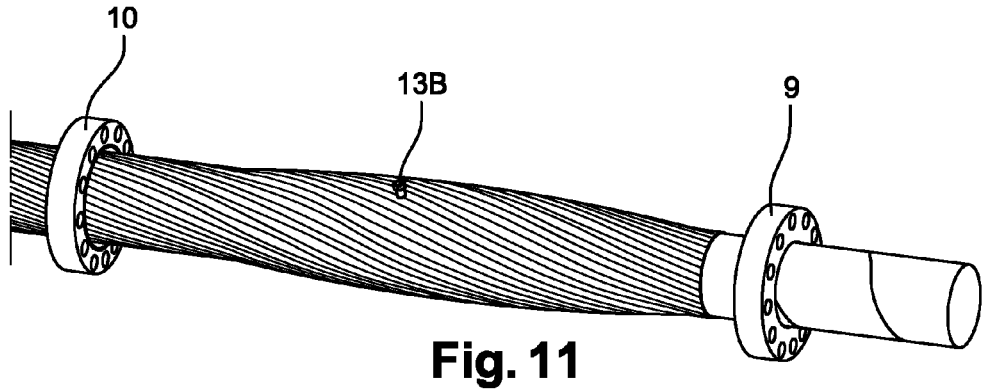

As shown in FIG. 11, the handles 13A, 13B are demounted and the second flange 9 is then threaded over the end of the cable.

Figure 12:
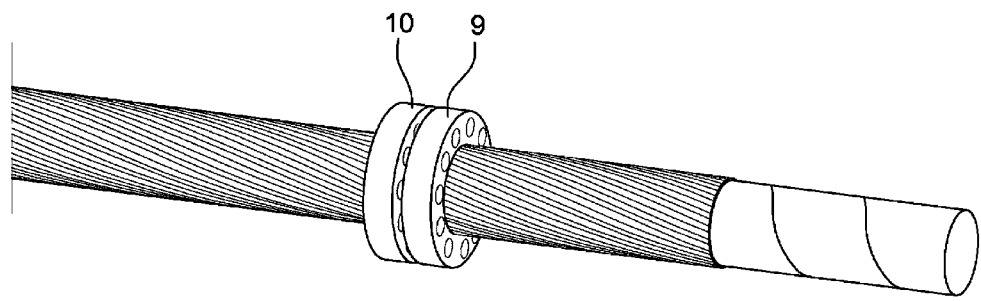

As shown in FIG. 12, the two flanges 9, 10 are butted up against the enlargement formed by the ring 8 under the screen 2A.

Figure 13:
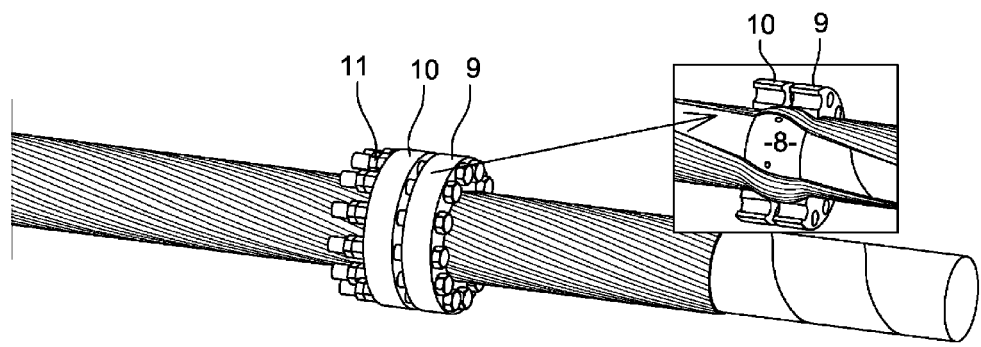

As shown in FIG. 13, the screwing system 11 consisting of a certain number of bolts is disposed in orifices in the flanges 9, 10 and clamps the two flanges against the ring 8 with the interposed screen 2A.

The invention claimed is:

1. Method of managing thermal contraction of a superconductor cable having a cable body surrounded by an external screen made from mechanically strong wires or tapes wound with a certain pitch and installed between its ends in an enclosure or cryostat filled with a cryogenic liquid said method comprising the steps of:

mechanically applying a locking force, loading only said screen at a so-called locking point in the vicinity of said ends of the cable, wherein the pitch of said wires or tapes remains constant spite of a resulting constant cooling contraction force tending to tighten said wound wires or tapes of the screen and to reduce their winding pitch between the two ends of the cable, and consequently a radial pressure resulting on all the other elements or layers of the superconductor cable constituting the cable body, which locks them, preventing longitudinal displacement caused by thermal contraction of the cable.

2. Method according to claim 1, wherein said method includes mechanically locking said screen between each of said ends of the cable and said enclosure.

3. Method according to claim 1, wherein said method includes mechanically locking said screen in a supplementary cryostat module disposed between each of said ends of the cable and said enclosure.

4. Method according to claim 1, wherein said locking force is transmitted to a support device fixed to the ground or the like.

5. Method according to claim 1, wherein the contraction between said locking point and the nearby end of the cable is managed by a sliding contact.

6. Method of installing a locking arrangement used for implementing a method of managing thermal contraction of a superconductor cable, said superconductor cable having a cable body surrounded by an external screen having mechanically strong wires or tapes wound with a certain pitch, and installed between its ends in an enclosure or cryostat filled with a cryogenic liquid, wherein said locking arrangement includes a ring disposed under said screen at a locking point and two annular flanges of complementary internal shape disposed on either side of the plane of symmetry of said ring and clamped to each other, wherein at least one of said flanges is fastened to a support device fixed to the ground or the like, said method of installing the locking arrangement comprises the step of:

sliding said ring under said screen from the end of the cable as far as the locking point and then installing said clamps, at the end of the cable said ring being equipped with two removable external handles disposed between two adjacent conductor elements of the screen and being turned and slid as far as the locking point and wherein said method of managing thermal contraction comprises the step of:

mechanically applying a locking force loading only said screen at said so-called locking point in the vicinity of said ends of the cable, the pitch of said wires or tapes remaining constant in spite of the resulting constant cooling contraction force tending to tighten said wound wires or tapes of the screen and to reduce their winding pitch between the two ends of the cable, and consequently a radial pressure resulting on all the other elements or layers of the superconductor cable constituting cable hod which locks them, preventing longitudinal displacement caused by thermal contraction of the cable.

* * * * *

UNITED STATES PATENT AND TRADEMARK OFFICE
CERTIFICATE OF CORRECTION

PATENT NO. : 8,583,202 B2
APPLICATION NO. : 13/204897
DATED : November 12, 2013
INVENTOR(S) : Schmidt et al.

Page 1 of 1

It is certified that error appears in the above-identified patent and that said Letters Patent is hereby corrected as shown below:

In the Claims

Column 5, Claim 6, Line 2: Delete "hod", and insert --body--.

Signed and Sealed this
Fourth Day of February, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO. : 8,583,202 B2
APPLICATION NO. : 13/204897
DATED : November 12, 2013
INVENTOR(S) : Schmidt et al.

It is certified that error appears in the above-identified patent and that said Letters Patent is hereby corrected as shown below:

IN THE SPECIFICATION

Under column 1, line 6 and before "Related Application" please insert the below statement.

--This Invention was made with government support under Contract No. DE-FC26-07NT43240 awarded by the Department of Energy. The Government has certain rights in this invention.--

Signed and Sealed this
Tenth Day of November, 2015

Michelle K. Lee
*Director of the United States Patent and Trademark Office*